Figure 1:
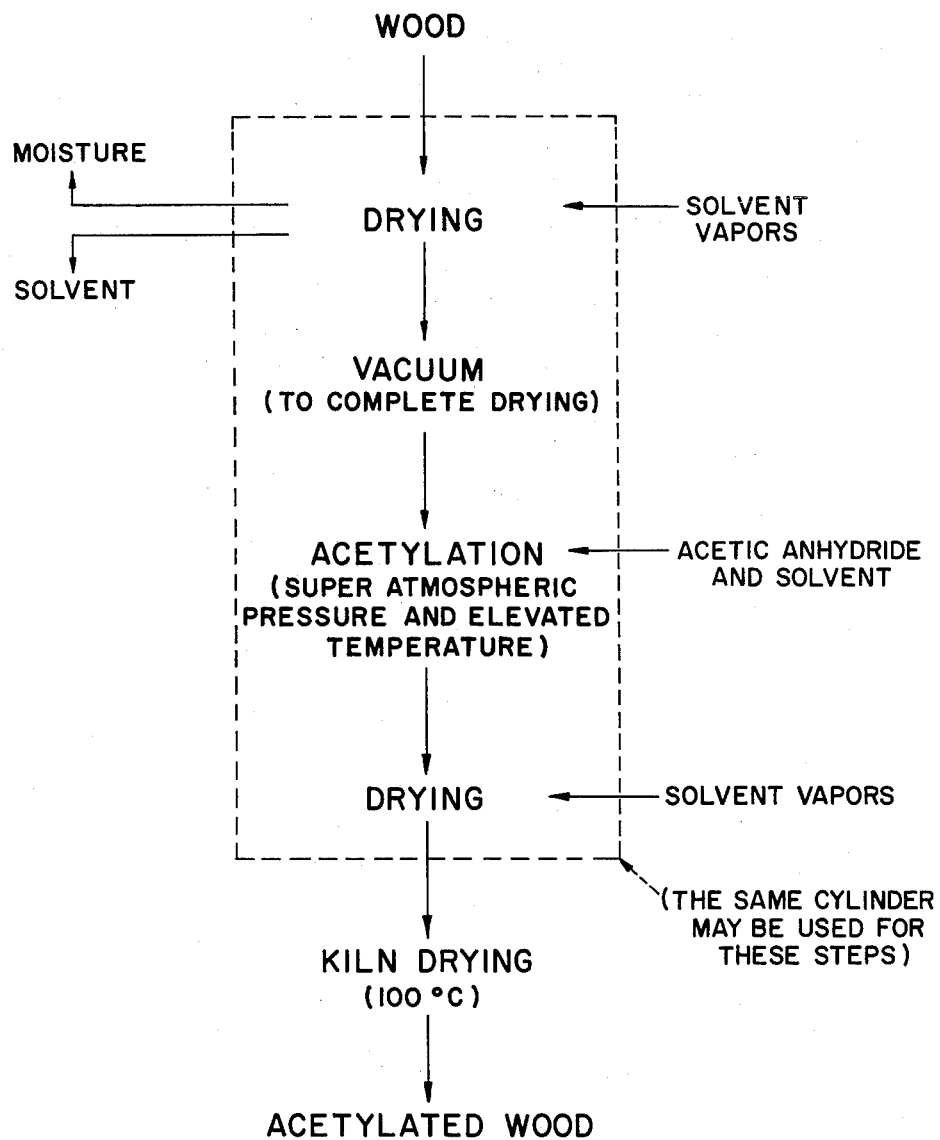

INVENTORS.
IRVING S. GOLDSTEIN &
JEREMIAH W. WEAVER
BY J.E. Armstrong
their ATTORNEY

3,094,431
PROCESS OF ACETYLATING WOOD
Irving S. Goldstein, Pittsburgh, Pa., and Jeremiah W. Weaver, Greensboro, N.C., assignors to Koppers Company, Inc., a corporation of Delaware
Filed Mar. 22, 1961, Ser. No. 97,537
5 Claims. (Cl. 117—59)

This invention relates generally to the treatment of wood and, more particularly, to the acetylation of wood to improve its properties with respect to dimensional stability and decay resistance while maintaining the other inherent qualities of the wood.

Wood is a widely used material because it has great strength for its weight, is easily shaped and fastened, has low heat and electrical conductivity, has high impact strength and is decorative. Wood does have certain disadvantages, however, because of the water-binding power of its cellulosic hydroxyl groups, wood is hygroscopic and undergoes dimensional changes when exposed to varying conditions of humidity. Wood also is destroyed by certain fungi and insects which are capable of using wood components for food.

A chemical modification of wood can be brought about by esterification of the cellulosic hydroxyl groups with organic acids or their corresponding anhydrides so as to cure the foregoing defects. If enough of the hydroxyl groups are esterfied, cellulolytic enzymes of attacking organisms are confronted with an incompatible substrate which prevents the destruction of the wood. Also, esterification bulks the wood, thereby preventing great dimensional changes due to variations in humidity.

A convenient esterification reaction for wood is acetylation. Wood flour or saw dust has been acetylated by Fuchs (Ber. 61, 948), Suida (Ber. 61, 1599), and Horn (Ber. 61, 2542) in 1928. Fuchs and Horn used acetic anhydride containing 0.25% sulfuric acid. Suida used acetic anhydride-pyridine mixtures or acetic anhydride alone and the process involved treatment for 15 hours. Friese (Ber. 63, 1902), in 1930 acetylated powdered wood at room temperature by the use of a mixture of acetic acid and acetic anhydride, which was catalyzed by sulfuric acid.

Stamm United States patent, No. 2,417,995, describes the treatment of veneers of one-eighth inch in thickness with a moisture-free acetylation medium containing acetic anhydride (free from acetic acid) either alone or mixed with other components such as a tertiary amine and acetone. The preferred treatments are carried out as a vapor phase operation with a mixture of acetic anhydride and pyridine, which medium can be used both as a swelling agent and an acid acceptor to drive the reaction forward. This acetylation has not had commercial acceptance because of certain disadvantages such as, pyridine forms complexes making recovery difficult; pyridine and acetone swell the wood and cause cracking and checking on drying just as water does, and also require the temperature to be kept at a low point so that the reaction period is relatively long; and the various operations also require a substantial amount of handling of noxious or flammable chemicals. The use of acetic anhydride alone will require that an excess of anhydride be used to sufficiently acetylate the wood which excess will cause the wood to shrink upon removal during drying.

It has now been found that dry wood of substantial length, width and thickness can be successfully acetylated by impregnating the wood with acetic anhydride in an inert nonswelling solvent under pressure at an elevated temperature, and then drying the wood to a constant weight.

A convenient way of carrying out this invention involves loading partially dried or green wood into a treating cylinder and drying the wood by a vapor drying operation. This involves introducing organic solvent vapors of a non-swelling for wood aromatic or chlorinated lower aliphatic hydrocarbon substantially water immiscible, acetic anhydride miscible solvent having a boiling point of at least about 80° C. in the treating cylinder, whereupon a fraction of the solvent vapors condense on the surface of the wood and flash-off the moisture as vapor. The condensed solvent is drained from the cylinder. The liberated water vapor and excess organic vapors are conducted from the treating cylinder, condensed, and separated by decantation. The drying period, which depends on the original moisture content of the wood, is completed. A vacuum, which serves to remove residual traces of moisture and vapor, is pulled on the treating cylinder after the drying period.

The acetylation step comprises introducing acetic anhydride with a nonswelling for wood aromatic, hydroaromatic or chlorinated hydrocarbon substantially water immiscible, acetic anhydride miscible solvent having a boiling point of at least about 80° C. into the cylinder at about 125° C. The pressure in the cylinder is increased to approximately 150 p.s.i.g. and this pressure and a temperature of 125° C. is maintained for an acetylation period of approximately twelve hours. The treating solution is then drained from the cylinder. Residual acetic acid-acetic anhydride is removed from the wood by vapor drying with the solvent for a period of approximately twelve hours at 125° C. and a pressure of 200 mm. Hg. The thus removed treating solution may be reused several times before cleaning up by distillation. Distillation of the condensate which contains acetic acid, acetic anhydride and solvent will recover the acetic anhydride and the solvent for recycle and also supply acetic acid as a byproduct. After a final vacuum, the acetylated wood is removed from the cylinder. Residual solvent, if any, may be removed in a kiln or allowed to evaporate.

The foregoing method of acetylation is advantageous because the wood to be impregnated is not handled physically from step to step. The green wood can be placed in a treating cylinder, dried, acetylated, dried again and removed ready for shipment without any intermediate handling. The performance of the entire cycle within the one cylinder advantageously eliminates a great deal of the irritation caused by the acetic anhydride.

FIGURE 1 schematically illustrates by flow diagram the novel process for acetylating wood.

The impregnating solution is prepared by mixing acetic anhydride (or other suitable anhydrides such as propionic anhydride or butyric anhydride) with a nonswelling for wood, aromatic, hydroaromatic or chlorinated hydrocarbon substantially water immiscible, acetic anhydride miscible solvent having a boiling point of at least about 80° C. The use of this particular class of higher boiling solvents is preferred since the boiling point of the acetylating medium and, hence, the reaction temperature is raised enough so that the acetylation takes place at a reasonable rate even without a catalyst. The elimination of a catalyst is extremely desirable because the use of mineral acid or acid salt catalysts causes hydrolysis of the cellulose chains resulting in embrittlement of the wood. When an alkaline catalyst, such as pyridine, is used, embrittlement of the wood will not occur but the separation of the pyridine from the excess acetic anhydride and by-product acetic acid, is extremely difficult, expensive and time consuming.

A higher boiling point also facilitates the removal of by-product acetic acid and excess acetic anhydride during vapor drying. The use of these solvents which do not swell the wood is necesary to minimize distortion and checking of the wood during the drying step. Checking will occur if the wood has been swollen and subsequently shrunk upon removal of a swelling agent. Preferred solvents of the above indicated class include mono and di-chlorobenzenes, toluene, xylene, benzene, alkyl benzenes, trichloroethylene, tetrachloroethylene, carbon tetrachloride, cumene and mixtures thereof.

For purposes of acetylating thick pieces of wood within a reasonable time, it is necessary that the reagent be brought in contact with all the wood as quickly as possible. This is best accomplished by a full cell pressure impregnation consisting of the vacuum period followed by a pressure period. The amount of reagent injected may be controlled by its concentration in the impregnating solution. Total retention of impregnant depends on the void volume of the wood, which volume can be determined from the density of the wood. It is important that only the required amount of reagent for acetylation be injected to minimize the stresses on the wood during the removal of excess reagent and by-product. This can be accomplished by carefully metering in the correct amount of anhydride necessary to obtain the required weight gain in the wood so that there is no excess reagent present in the wood which will be forced out of the wood during the drying period and would thereby likely cause severe shrinkage. Because the solvent used as the carrier for the reagent is particularly characterized as inert and nonswelling for wood, there is no additional shrinkage of the wood during the removal of the solvent. By experimental verification, as is shown in the examples hereinafter described, it has been established that a weight gain from acetylation of at least 18 percent and preferably 20 percent is desirable to produce wood having advantageous properties. It is, therefore, possible to calculate the ratio of the acetic anhydride in solvent solution which will provide sufficient injected acetic anhydride for 20 percent weight gains in wood of varying density.

Sample calculations for acetic anhydride dilution for wood of varying densities are illustrated in Table I:

*Table I*

APPROXIMATE DILUENT NEEDED TO LIMIT ACETIC ANHYDRIDE IMPREGNATED BY FULL CELL PROCESS TO AMOUNT REQUIRED FOR 20 PERCENT WEIGHT GAIN OF THE ACETYLATED WOOD.

| Density of wood (gms./ml.) | Parts by volume of acetic anhydride | Parts by volume of diluent |
|---|---|---|
| 0.1 | 1 | 20 |
| 0.2 | 1 | 9 |
| 0.3 | 1 | 5 |
| 0.4 | 1 | 3.2 |
| 0.5 | 1 | 2 |
| 0.6 | 1 | 1.3 |
| 0.7 | 1 | 0.7 |
| 0.8 | 1 | 0.33 |

The values obtained in the foregoing table were based on the following calculations. For purposes of illustration, the sample, having a density of 0.5 gms./ml. as shown in the above table will be used. The void volume of the sample was determined by the following formula:

Void volume = total volume (1 ml.)
$$- \frac{\text{weight of 1 ml. of wood (gms.)}}{\text{density of reactant material (ligno cellulose 1.5 gm./ml.)}}$$

In a sample of wood having a dry density of 0.5 gm./ml., one ml. of the wood will weigh 0.5 gm. The density of ligno cellulose material in the same sample is 1.5 gm. per ml. Substituting these figures in the above equation, the void volume of this test sample of wood is equal to 0.667 ml. To obtain a 20 percent increase in weight of a volume of wood of 1 ml. which weighs 0.5 gm., a weight gain of .10 gm. is required. The weight gain of the wood will be comprised of the acetyl substitution which takes place in the wood. The acetic anhydride (acetyl donating compound) needed to provide the 20 percent weight gain is calculated according to the following:

$$\frac{\text{Molecular weight of acetic anhydride}}{\text{Molecular weight of acetyl}} \times \text{weight gain necessary}$$

In our sample this would equal $$\frac{102}{43} \times 0.10 = 0.238 \text{ gm. acetic anhydride}$$

The known density of acetic anhydride is 1.08 gm./ml. and, therefore, the void volume to be filled by .238 gm. acetic anhydride to provide a 20 percent weight gain in the wood, will equal .220 ml. For this sample of wood which has a void volume of .667 ml., to insure a total injection to fill the entire void volume during the impregnation, it will be necessary that the remaining .447 ml. of void volume be filled with the nonswelling solvent. The mixture of anhydride and solvent to be used for this particular impregnation must, therefore, contain two parts solvent to one part acetic anhydride.

The impregnation step is not limited to any particular temperature and pressure ranges. For most purposes, vacuum and then pressure is applied; the purpose of impregnation is to bring the acetylating solution in contact with the wood and this may be easily accomplished by the well-known techniques of pressure impregnation. For some species of wood, vacuum followed by atmospheric pressure will suffice. For others, pressures of up to 200 p.s.i. are required. Impregnating conditions will vary with the species and cross-sectional size of the wood. Since pressure is maintained on the cylinder during the 8–16 hour reaction time, the time required to impregnate is not individually separated from the time of the reaction. The acetylating solutions used herein are much less viscous than conventional impregnating solutions such as creosote and, consequently, the impregnation of ordinarily difficultly permeable wood proceeds readily.

After the impregnation and the reaction, the excess acetic anhydride and by-product acetic acid are distilled out of the wood in the vapor drying step. The condensate from vapor drying may be further distilled to recover acetic acid and the higher boiling solvent and excess acetic anhydride may be returned to the acetylating solution with fresh acetic anhydride to repeat the reaction.

Large pieces of wood which have been acetylated as hereinbefore described have a reduction in swelling of at least 75 percent without having impact strength impaired, and have the characteristic of resistance to attack by wood destroying fungi and termites and, surprisingly, have minimal amounts of checking and splitting.

The following laboratory examples describe the process for successfully acetylating large pieces of wood using acetic anhydride diluted with an inert hydrocarbon solvent and the improvements in the properties of the wood so acetylated.

EXAMPLE I

Several pieces of ponderosa pine 2 x 4 inches in cross section were dried in an oven at 105° C., weighted down in pans and covered with treating solution of 50 percent acetic anhydride dissolved in xylene on a volume to volume basis. The treating pans were placed in a jacketed vacuum pressure treating cylinder and a vacuum of 27 inches of mercury was applied for one hour followed by air pressure to 150–170 p.s.i.g. for 16 hours at 105° C. The pieces of wood were then transferred to a resin pot in which a rack was placed above 500 ml. of xylene for holding the samples. The xylene, acetic anhydride, acetic acid mixture was azeotropically distilled from the pot at 138–140° C. and simultaneously, fresh xylene was added dropwise from a dropping funnel to maintain a constant reservoir of 500 ml. of xylene in the resin pot. This distillation continued until no excess acetic anhydride or by-product acetic acid was found in the distillate (10 hrs.). Using this drying technique, it was found that no checking occurred in the treated samples.

The same procedure of Example I was used to impregnate several different species of wood. The results of these impregnations are shown in Table II.

*Table II*

|  | Species | Solvent | Checking |
|---|---|---|---|
| Example II | Western hemlock | Benzene | None. |
| Example III | Maple | Ethylene chloride | Do. |
| Example IV | Hickory | Toluene | Do. |
| Example V | Red Oak | Chlorobenzene | Do. |
| Example VI | Cherry | Carbon tetrachloride. | Do. |
| Example VII | Walnut | Xylene | Do. |
| Example VIII | Cativo | Cumene | Do. |
| Example IX | Mahogany | Dichlorobenzene | Do. |
| Example X | Douglas-fir | Ethyl benzene | Do. |
| Example XI | Southern yellow pine. | Trichloroethylene | Do. |
| Example XII | Redwood | Tetrachloroethylene. | Do. |

EXAMPLE XIII

The same procedure of Example I was followed except that similar samples of wood used in Examples I through XII were acetylated with undiluted acetic anhydride. After vapor drying, checking was very evident in these samples.

EXAMPLE XIV

Woods as prepared by the process of Examples I through XII were measured for dimensional stability.

It is known that when water in either the vapor or liquid phase enters a cellulose fiber, hydrogen bonds are established between the water and the cellulosic hydroxyl groups in the amorphous regions. A molecule of water forces apart the cellulose chain and the fiber swells. Wood swells mostly in the tangential direction, i.e. tangential to the annual rings, half as much in the radial direction and very little, if at all, in the longitudinal direction. When these hydroxyl groups are converted to acetate, hydrogen bonding with water is decreased in proportion to the fraction of accessible hydroxyl groups converted. In addition, the relatively large size of the acetyl group forces apart the cellulose chains and maintains the wood in a permanently swollen condition when the wood is dried. Such wood is said to be dimensionally stable. The swelling and shrinking of wood cannot be prevented completely by treating with a reagent whose molecules are larger than those of water, but swelling and shrinkage can be considerably reduced. This alteration in swelling is reported as "percent reduction in swelling" which is equal to:

$$1 - \frac{\text{tangential swelling of treated specimen (percent)}}{\text{tangential swelling of control (percent)}} \times 100$$

Table III shows the tangential swelling under moist conditions and in liquid water absorbed in 12 species of wood before and after acetylation at 125° C. with acetic anhydride in a nonswelling hydrocarbon solvent.

*Table III*

TANGENTIAL SWELLING OF VARIOUS SPECIES OF WOOD ACETYLATED AT 125° C.

| Species | Swelling in percent of oven-dry tangential dimension | | | |
|---|---|---|---|---|
|  | At 80° F., 70% RH | | Liquid water | |
|  | Untreated | Acetylated | Untreated | Acetylated |
| Ponderosa pine | 2.6 | 0.5 | 5.6 | 1.3 |
| Western hemlock | 5.5 | 0.9 | 12.3 | 2.7 |
| Maple | 4.5 | 1.0 | 11.4 | 2.7 |
| Hickory | 3.8 | 0.7 | 12.0 | 2.3 |
| Red oak | 3.8 | 0.8 | 8.8 | 2.2 |
| Cherry | 3.0 | 0.9 | 8.2 | 2.2 |
| Walnut | 3.0 | 0.8 | 8.8 | 2.1 |
| Cativo | 2.8 | 0.5 | 7.0 | 1.5 |
| Mahogany | 2.7 | 0.8 | 6.4 | 1.9 |
| Douglas-fir | 2.4 | 0.6 | 5.1 | 1.5 |
| Southern yellow pine | 2.3 | 0.5 | 5.7 | 1.7 |
| Redwood | 2.2 | 0.4 | 4.6 | 1.2 |

EXAMPLE XV

Species of the wood which were acetylated in the foregoing examples were evaluated in order to determine their decay resistance to wood destroying fungi. Small blocks ¾" cube cut from these samples were weathered for one month on a laboratory weathering device and then exposed to the test organisms for three months in the soil block test procedure of Duncan and Richards, Proc. Am. Wood Preservers Association 46: 131–151 (1950). The fungi used were *Lenzites trabea* (Madsion 617) and *Polyporus versicolor* (Madison 697). The results follow in Table IV.

*Table IV*

EXPOSURE OF SEVEN SPECIES OF ACETYLATED WOOD TO WOOD DESTROYING FUNGI

| Species | Treatment | Percent net weight gain due to treatment | Percent weight loss exposed to Madison 617 | Percent weight loss exposed to Madison 697 |
|---|---|---|---|---|
| Hemlock | Acetylated | 27.6 | 0.9 | 1.1 |
| Do | Control |  | 38.6 | 27.3 |
| Southern yellow pine | Acetylated | 19.6 | 1.6 | 1.4 |
| Do | Control |  | 24.8 | 29.0 |
| Oak | Acetylated | 19.3 | 1.2 | 0.9 |
| Oak | Control |  | 19.8 | 53.9 |
| Douglas-fir | Acetylated | 25.1 | 1.6 | 0.9 |
| Do | Control |  | 14.6 | 6.0 |
| Redwood | Acetylated | 25.2 | 1.6 | 2.3 |
| Do | Control |  | 1.2 | 1.5 |
| Ponderosa pine | Acetylated | 25.7 | 1.5 | 1.3 |
| Do | Control |  | 28.2 | 31.4 |
| Maple | Acetylated | 19.0 | 0.5 | 4.6 |
| Do | Control |  | 70.7 | 36.3 |

EXAMPLE XVI

Figure 2:
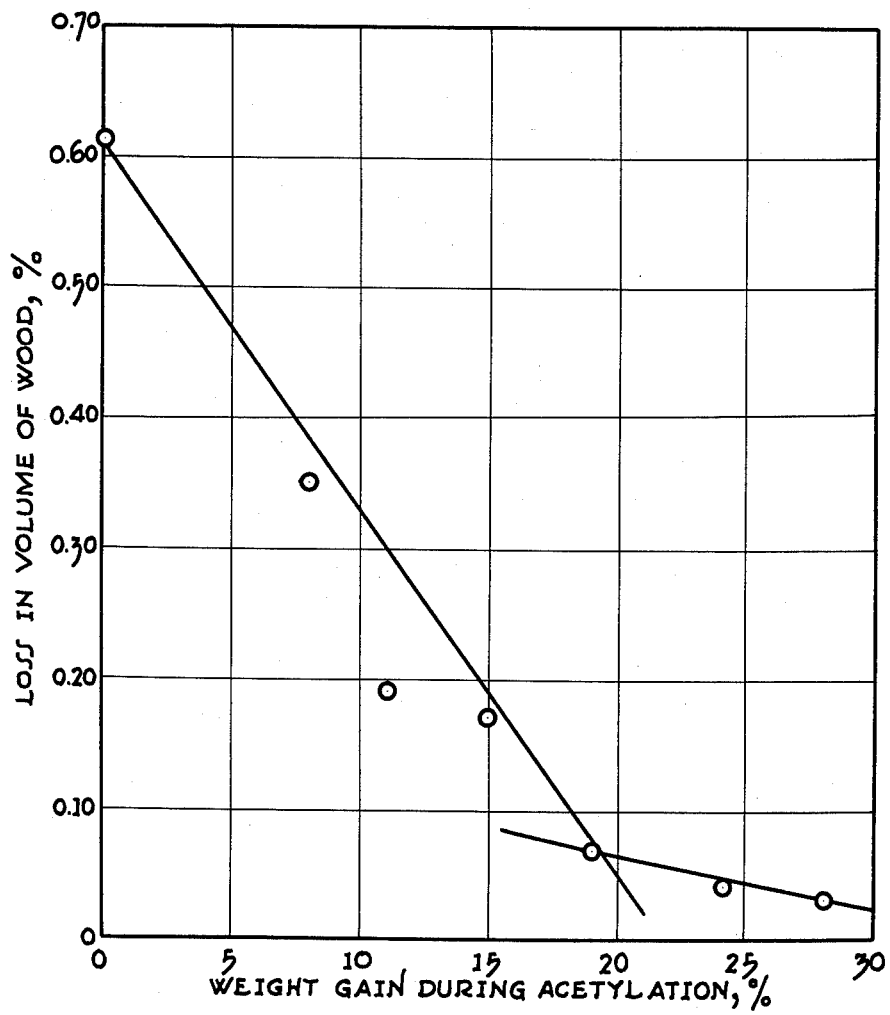

Southern yellow pine specimens ¾ x ¾ x 2 inches were acetylated according to the process of Example I to weight gains of from 8–28 percent, weathered for 30 days on the laboratory weathering device and sanded smooth on all faces. Each block was then buried in moistened sand in a jar containing 25 termites. After 20 days, the blocks were recovered and the losses in volume of the wood were computed and plotted against the weight gain by each block during acetylation. The results shown on the drawing, FIGURE 2, indicate an apparent threshold near the 18 percent value for weight gained during acetylation. It is apparent that the termites can attack the acetylated wood at low degrees of acetylation but cannot subsist on it at the higher degrees of acetylation.

EXAMPLE XVII

Samples of southern yellow and ponderosa pine and Douglas fir were cut into 2 x 10 inch blocks and acetylated according to the process of Example I and exposed to varying weathering conditions. The dimensional stabilities of these samples were determined after 3, 6 and 12 months. Several control examples of the same wood but in its natural state were also tested for weathering. The results shown in Table V show a small but negligible decrease in dimensional stability with time of weathering in the treated samples.

Table V

WEATHER RESISTANCE OF ACETYLATED WOOD

| Species | Treatment | Exposure time, mos. | Acetyl, percent[1] | 80° F., 70% RH ||| 
|---|---|---|---|---|---|---|
| | | | | Moisture pickup, percent | Tangential swell, percent | Stabilization efficiency, percent |
| SYP | Control | 0 | 4.6 | 12.0 | 3.1 | |
| SYP | do | 3 | 5.3 | 13.2 | 3.4 | |
| SYP | do | 6 | 4.7 | 10.8 | 2.6 | |
| SYP | do | 12 | 4.6 | 11.9 | 2.6 | |
| SYP | Acetylated | 0 | 21.5 | 4.6 | 0.7 | 78 |
| SYP | do | 3 | 23.2 | 5.5 | 1.0 | 69 |
| SYP | do | 6 | 20.8 | 4.4 | 0.9 | 66 |
| SYP | do | 12 | 21.1 | 5.0 | 0.9 | 64 |
| Ponderosa pine | Control | 0 | 4.7 | 11.0 | 2.5 | |
| Do | do | 3 | 4.6 | 12.4 | 2.9 | |
| Do | do | 6 | 3.7 | 10.1 | 2.6 | |
| Do | do | 12 | 4.6 | 11.6 | 2.6 | |
| Do | Acetylated | 0 | 22.9 | 3.9 | 0.6 | 76 |
| Do | do | 3 | 23.4 | 4.8 | 0.8 | 71 |
| Do | do | 6 | 21.5 | 3.9 | 0.8 | 67 |
| Do | do | 12 | 22.4 | 4.3 | 0.9 | 66 |
| Douglas-fir | Control | 0 | 4.4 | 10.6 | 2.7 | |
| Do | do | 6 | 5.4 | 9.5 | 2.2 | |
| Do | do | 12 | 5.3 | 10.5 | 2.3 | |
| Do | Acetylated | 0 | 24.0 | 3.5 | 0.7 | 75 |
| Do | do | 6 | 22.9 | 3.2 | 0.6 | 73 |
| Do | do | 12 | 24.4 | 3.7 | 0.8 | 65 |

[1] The acetyl content reported is total apparent acetyl, i. e., uncorrected for the content of the untreated wood.

EXAMPLE XVIII

Samples of southern yellow and ponderosa pine 2 x 6 x 15 inches were acetylated according to the process of Example I to weight gains of 18–20 percent and then cut into impact strength specimens ½ x ½ x 5 inches together with end matched controls. These were conditioned and broken on a Tinius Olsen plastic impact tester with a Charpy head on a four inch span. The results are shown in Table VI.

Table VI

IMPACT STRENGTH OF ACETYLATED PINES

| Species | Treatment | Number of specimens | Impact strength, inch-lbs. | Standard deviation |
|---|---|---|---|---|
| SYP | Acetylated | 78 | 37.3 | ±13.2 |
| SYP | Control | 53 | 43.0 | ±13.4 |
| Ponderosa pine | Acetylated | 78 | 20.0 | ±4.0 |
| Do | Control | 79 | 17.3 | ±3.7 |

It is apparent that any changes in the impact strength of these species of pine associated with acetylation are within the limits of error of the methods used to determine this property. It can readily be concluded that acetylation by this method does not reduce impact strength.

The foregoing has presented a novel process for the acetylation of wood, whereby it is now possible to provide a product that has improved dimensional stability and decay resistance, and that is useful for models and patterns, musical instruments, sporting goods, furniture, bowling lanes, parquet floorings, mill work, gun stocks, print blocks and boat lumber. The wood, as prepared in accordance with the process of this invention, retains all of the desirable properties of wood, including impact resistance, low heat and electrical conductivity, great strength for its weight, aesthetic value, and the ability to be easily shaped and fastened.

Severe checking leads to a decrease in strength and a poor appearance of the so-treated wood. The use of the nonswelling solvents in accordance with this invention in mixture with acetic anhydride has overcome these disadvantages. Wood treated in accordance with this invention will swell and shrink only 20–30 percent as much as the original wood. Measurements indicated that there is no loss in toughness and impact strength and the other dry strength properties of the wood have not been degraded. The decorative appearance is not impaired and, in fact, some types of wood become attractively lighter in color.

We claim:

1. A process for improving the dimensional stability and decay resistance of wood by acetylation, which comprises: subjecting wood to vapors of a nonswelling for wood, substantially water immiscible, acetic anhydride miscible solvent selected from the group consisting of aromatic and chlorinated lower-aliphatic hydrocarbons, said solvent having a boiling point of at least about 80° C. whereby a portion of the solvent vapor is condensed on a portion of the wood to flash-off the moisture as vapor, draining the condensed solvent from the wood, subjecting the wood to a vacuum whereby the remaining portion of the solvent and moisture is removed from the wood, subjecting the wood to a mixture of acetic anhydride and the aforesaid nonswelling for wood solvent containing sufficient anhydride based on the density of the wood at a pressure of about 150 p.s.i.g. and 100–130° C. for about 8–16 hours, whereby a weight gain to the wood from acetylation of at least 18 percent is obtained, removing the acetic anhydride from the wood by again subjecting said wood to nonswelling for wood solvent vapors which condense on the wood, removing the latter condensed vapors from the wood, and thereafter drying the wood until the wood reaches a constant weight.

2. A process for improving the dimensional stability and decay resistance of wood by acetylation, which comprises: subjecting wood to solvent vapors of a nonswelling for wood substantially water immiscible, acetic anhydride miscible solvent selected from the group consisting of aromatic and chlorinated lower-aliphatic hydrocarbons, said solvent having a boiling point of at least about 80° C. whereby a portion of the solvent vapor is condensed on a portion of the wood and flashes off the moisture as vapor, draining the condensed solvent from the wood, subjecting the wood to a vacuum whereby the remaining portion of the solvent and moisture is removed from the wood and subjecting the wood to a mixture of acetic anhydride and said nonswelling solvent containing sufficient anhydride based on the density of the wood at a pressure of 150 p.s.i.g. and 100–130° C. for about 8–16 hours, whereby a weight gain to the wood from acetylation of at least 18 percent is obtained, removing the acetic anhydride from the wood by again subjecting said wood to said nonswelling for wood solvent vapors which condense on the wood and removing the condensed vapors from the wood, thereafter kiln drying the wood at a temperature of 100° C. until the wood reaches a constant weight.

3. A process for improving the dimensional stability of wood by acetylation, which comprises: subjecting the wood to a bath of acetic anhydride in a nonswelling for wood substantially water immiscible, acetic anhydride miscible solvent selected from the group consisting of aromatic and chlorinated lower-aliphatic hydrocarbons, said solvent having a boiling point of at least about 80° C. containing sufficient anhydride based on the density of the wood and under super atmospheric pressure at an elevated temperature to esterify the wood, and then drying the wood to a constant weight whereby a weight gain to the wood from acetylation of at least 18 percent is obtained.

4. In a process for improving the dimensional stability of wood by acetylation by impregnating the wood with acetic anhydride under pressure at an elevated temperature and then drying the wood to a constant weight, the improvement which comprises mixing acetic anhydride with an inert nonswelling for wood substantially water immiscible, acetic anhydride miscible solvent selected from the group consisting of aromatic and chlorinated lower-aliphatic hydrocarbons, said solvent having a boiling point of at least about 80° C., the acetic anhydride being in a sufficient amount based on the density of the wood to provide on impregnation a weight gain to the wood of at least 18% based on the density of the wood prior to the impregnation.

5. A process for improving the dimensional stability and decay resistance of wood by acetylation, which comprises: subjecting wood to vapors of a nonswelling for wood substantially water immiscible acetic anhydride miscible solvent selected from the group consisting of aromatic and chlorinated lower-aliphatic hydrocarbons, said solvent having a boiling point of at least about 80° C. whereby a portion of the solvent vapor is condensed on a portion of the wood to flash-off the moisture as vapor, draining the condensed solvent from the wood, subjecting the wood to a vacuum whereby the remaining portion of the solvent and moisture is removed from the wood, subjecting the wood to a mixture of acetic anhydride and the aforesaid nonswelling for wood solvent containing sufficient anhydride based on the density of the wood at a pressure of 150 p.s.i.g. and 125° C. for twelve hours, whereby a weight gain to the wood for acetylation of at least 18 percent is obtained, removing the acetic anhydride from the wood by again subjecting said wood to nonswelling for wood solvent vapors which condense on the wood, removing the latter condensed vapors from the wood, and thereafter drying the wood until the wood reaches a constant weight.

References Cited in the file of this patent
UNITED STATES PATENTS

| | | |
|---|---|---|
| 2,273,039 | Hudson | Feb. 17, 1942 |
| 2,417,995 | Stamm et al. | Mar. 25, 1947 |
| 2,633,429 | Hudson | Mar. 31, 1953 |
| 2,860,070 | McDonald | Nov. 11, 1958 |

FOREIGN PATENTS

| | | |
|---|---|---|
| 24,083 | Great Britain | 1904 |
| 494,253 | Great Britain | Oct. 24, 1938 |